US007039175B1

United States Patent
Foltak et al.

(10) Patent No.: US 7,039,175 B1
(45) Date of Patent: May 2, 2006

(54) CONFIGURABLE DIGIT COLLECTION FOR VARIOUS SIGNALING PROTOCOLS

(75) Inventors: Richard Foltak, Santa Clara, CA (US); Edward Groenendaal, Hornsby (AU)

(73) Assignee: Cisco Technology, Inc., San Jose, CA (US)

( * ) Notice: Subject to any disclaimer, the term of this patent is extended or adjusted under 35 U.S.C. 154(b) by 795 days.

(21) Appl. No.: 09/587,164

(22) Filed: Jun. 2, 2000

(51) Int. Cl.
*H04M 7/00* (2006.01)

(52) U.S. Cl. .................. 379/229; 379/232; 379/240

(58) Field of Classification Search ............... 379/353, 379/399.02, 413.02, 232, 240
See application file for complete search history.

(56) References Cited

U.S. PATENT DOCUMENTS

| 5,239,542 A | * | 8/1993 | Breidenstein et al. ....... 370/376 |
| 5,544,236 A | * | 8/1996 | Andruska et al. ...... 379/201.02 |
| 5,778,059 A | * | 7/1998 | Loghmani et al. .......... 379/243 |
| 6,212,625 B1 | * | 4/2001 | Russell ........................ 712/217 |
| 6,272,217 B1 | * | 8/2001 | Cornes et al. ............... 379/333 |
| 6,327,508 B1 | * | 12/2001 | Mergard ........................ 700/5 |
| 6,356,627 B1 | * | 3/2002 | Hayball et al. ........ 379/112.01 |

* cited by examiner

*Primary Examiner*—Ahmad F. Matar
*Assistant Examiner*—Hector A. Agdeppa
(74) *Attorney, Agent, or Firm*—Marger Johnson & McCollom, P.C.

(57) ABSTRACT

A PSTN (Public Switching Telephone Network) device includes a Dynamically Configurable Signaling State Machine (DCSSM). The DCSSM can be programmed to recognize multiple signaling templates. The DCSSM can also be programmed to modify existing recognized standardized signaling templates. Programming is accomplished via a configuration interface. Commands are sent to the DCRSSM via the PSTN device's configuration interface. When the trunk controller receives a signal or is required to transmit a signal, the DCSSM executes the directives configured with the programmed signaling templates within a signaling state machine.

40 Claims, 8 Drawing Sheets

CONFIGURABLE DIGIT COLLECTION FOR VARIOUS SIGNALING PROTOCOLS

FIELD OF THE INVENTION

This invention pertains to Public Switching Telephone Network processing and, more particularly, to dynamically configuring signaling protocols used in Public Switching Telephone Network processing devices.

BACKGROUND OF THE INVENTION

PSTN (Public Switching Telephone Network) devices, such as POTS (Plain Old Telephone Switch), Carrier Switches, PBX (Private Branch Exchange) switches, NASes (Network Access Servers), etc. are all interconnected using TDM (Time Division Multiplexed) trunk connections to transmit voice and data between them. Furthermore, these network devices require a call manager to communicate between the various endpoints to accurately manage the actual voice or data payload on each of the connections. Call management is achieved with the use of signaling to relay call information between the different endpoints. This signaling is in addition to the actual voice or data payload that is transferred over the telephone network. For example, this signaling can transfer the phone numbers used in the telephone network to establish the connection links within the network to interconnect two or more end user devices, such as phones, together. In other examples, this signaling is used to inform the other endpoint of resource availability.

Various signaling protocols and architectures are used to interconnect devices within the PSTN. Over the years, little has changed with respect to the actual voice or data payload transfer over a DS0 timeslot on a TDM (Time Division Multiplexing) trunk. A DS0 timeslot is a single channel on the physical wire: that is, a single call transmitting and receiving between two endpoints. However, the signaling between the various PSTN devices has evolved substantially. Originally, the first digital signaling was designed to be in-band: that is, the signaling shared the DS0 timeslot with the actual voice or data payload. These TDM trunks were known as PTS (Pulse Trunk Signaling) trunks. Various flavors of PTS trunks have evolved in different geographical markets to address national regulatory and market requirements.

Eventually, architectural problems related to the fact that the signaling was in-band were discovered: e.g., blue-box fraud. New signaling architectures evolved to address these problems. PRI (Prime Rate Interface) and BRI (Basic Rate Interface) trunks provide dedicated timeslots within a trunk for signaling; thus, the signaling does not have to share a common medium with the voice and data payload such as PTS trunks. Newer signaling architectures such as SS7 (Signaling System 7) have further changed the PSTN architecture, doing the signaling on a separate communication network, giving more connectivity and management functionality than previously possible at a network-wide level. All the signaling formats are predominantly standardized and do not deviate from the standard. Furthermore, flavors of all these trunk types coexist in the current PSTN architecture. Although PTS trunks are considered old technology, their low lease access rates make them very popular in many PSTN architectures.

One PTS trunk flavor used within PSTN is known as CAS (Channel Associated Signaling). CAS has two components, line supervisory signaling for initiating and terminating calls, and address signaling for communicating the DNIS and ANI. ANI stands for Automatic Number Identification and DNIS stands for Dialed Number Identification Service.

Given a trunk with a known signaling type, the protocol of both the line supervisory and address signaling is known in advance. This is absolutely necessary, as the two device ends of a PSTN link must know how to communicate with each other. For example, a T1 CAS trunk with multi-frequency signaling in a DS0 channel is required to use an identical line signaling protocol and a "#ANI*#DNIS*" formatted address signal when passing digit collection information during call setup, where both ANI and DNIS digits are between 0–9.

In certain markets, some PSTN equipment vendors are being requested to implement non-standard address signaling protocols on their devices. But where proprietary signaling protocols are implemented, the standard signaling protocols will no longer work. In the past, PSTN network devices were "hard-coded" to recognize the proprietary signaling protocols with which they were expected to inter-communicate. A PSTN network device "hard-coded" to recognize a specific proprietary signaling protocol must be re-coded if a new proprietary signaling protocol is required for a particular market. Furthermore, a PSTN device using a standardized signaling protocol will have to be re-coded if the standardized signaling protocol changes to a proprietary one.

The present invention addresses this and other problems.

SUMMARY OF THE INVENTION

The invention includes a method and apparatus for using a DCSSM (Dynamically Configurable Signaling State Machine) to recognize a plurality of address signaling protocols. The DCSSM includes a configuration interface through which signaling protocols can be added to or removed from the DCSSM. As such, each CAS (Channel Associated Signaling) trunk can then be configured to use either a pre-configured standardized signaling protocol or one of the newly configured customer proprietary protocols, all residing on the PSTN (Public Switching Telephone Network) device's DCSSM. The basis of this invention depends on the fact that there are a finite set of actions which a Signaling State Machine supports within PSTN architectures. Mapping each of these actions to a parseable pattern string (also known as a template) which can be read by the Signaling State Machine allows for an indefinite permutation of possible signaling protocols to address both standardized and proprietary signaling types.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
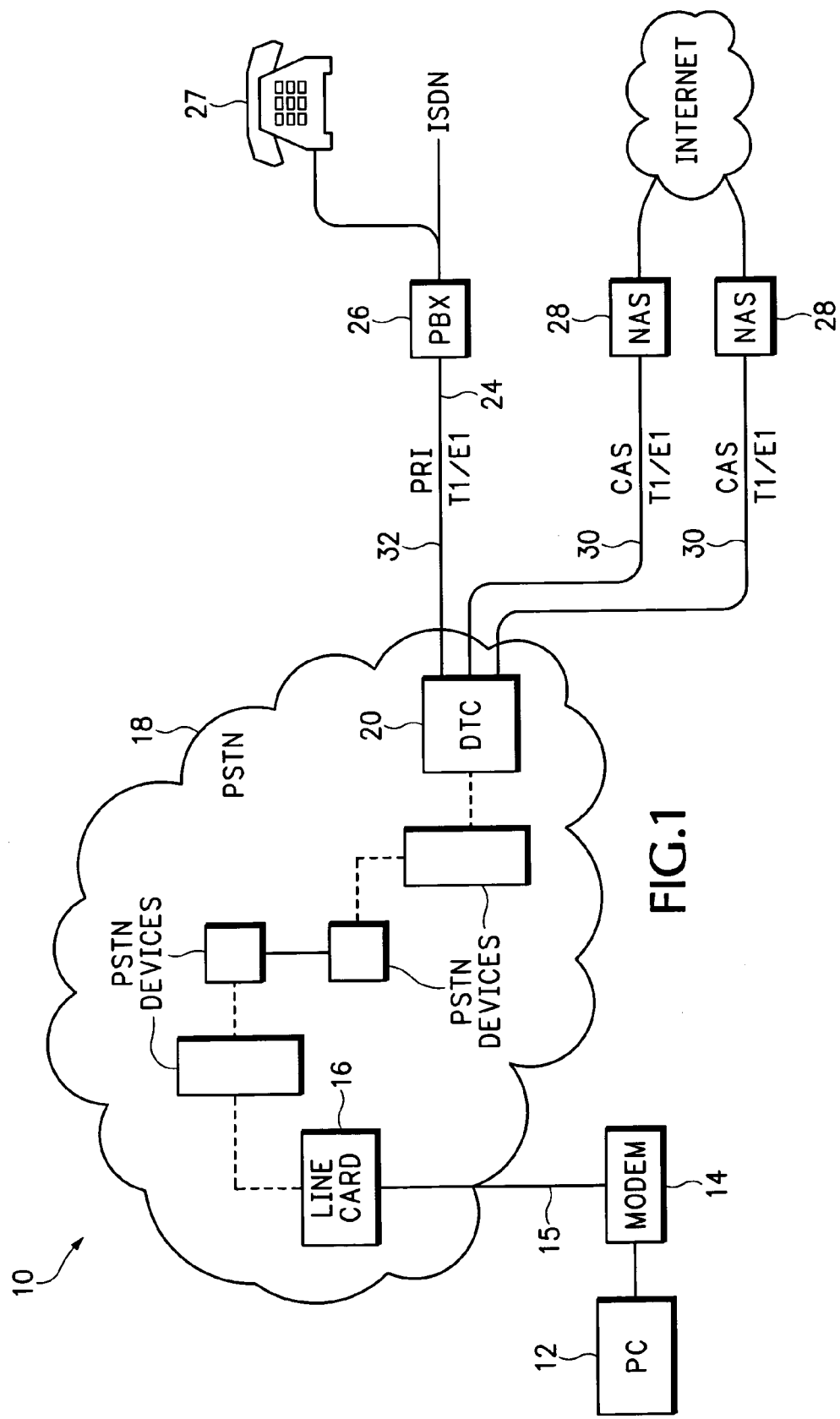
FIG. 1 shows a PSTN (Public Switching Telephone Network) communication network including a NAS (Network Access Server) in accordance with an embodiment of the present invention.

FIG. 1 shows an embodiment of the present invention to include a communication network system 10 for establishing communications between a point of origin and a destination point. The point of origin and destination point can be communications equipment, such as faxes, modems, Personal Computers (PC) and the like. In FIG. 1, an example of a destination point is shown to be a telephone 27 with another example being a NAS (Network Access Server) 28 modem. A NAS is a specialized router device that converts voice or data payload from a PSTN (Public Switching Telephone Network) network to a data network such as the Internet. A NAS typically maintains numerous DSPs (Digital Signal Processors) to act as either a modem, fax, or VoIP (Voice over IP) framers (converters).

In FIG. 1, the communication network 10 is shown to include an end-user PC 12, a modem device 14, coupled through a PSTN 18, a PBX (Private Branch Exchange) 26 and two NAS 28.

PSTN 18 includes devices such as POTS (Plain Old Telephone Switch) and/or Carrier "switches" that form a part of the public telephone network. While a switch is not shown in FIG. 1, a line card 16, as well as other communication devices such as a DTC (Digital Trunk Controller) 20, are shown in the PSTN 18. Line card 16 acts as the primary interface into PSTN 18 from any devices connected to the communication line 15 at the end-user's location (e.g., fax, phone, or modem). Line card 16 is responsible for sampling an analog data stream being transmitted on communication line 15 and converting it into a digital form. PSTN 18 is then responsible for multiplexing multiple line card 16 data streams into a single digital trunk which, using time slicing—allocating a timeslot within the trunk to a single call—can compress multiple calls into a single T1 or E1 trunk (or higher density trunks such as T3/E3). Certain countries, such as the US, utilize T1 trunk lines, whereas, others, such as European countries, utilize E1 trunk lines. The T1 or E1 trunk lines are then managed within PSTN 18 via carrier switches. Besides being T1 or E1 trunk lines, these trunks are leased to public or private companies for use as either PRI 32, CAS 30, SS7, etc., depending on the agreed upon terms. DTC 20 within PSTN 18 is used to manage the proper signaling and payload transfer from PSTN 18 devices to third party PSTN devices such as PBX 26, NAS 28, etc.

PSTN 18 devices are essentially carrier switches, and their corresponding peripherals are used by the telephone company for switching various incoming calls to different destinations. Generally, call setup information within PSTN 18 travels from one PSTN switch to another PSTN switch before it reaches its final destination. This call setup, along with possible additional PSTN inter-device communication is done with signaling.

Figure 2:
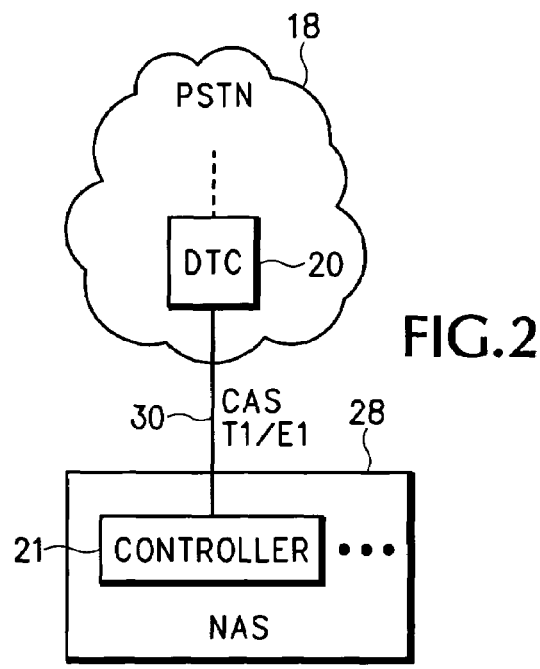
FIG. 2 shows a PSTN NAS including a Dynamically Configurable Signaling State connected to the PSTN using CAS (Channel Associated Signaling) signaling.

FIG. 2 shows a T1 CAS trunk line 30 between a DTC 20 in a PSTN 18 and a T1/E1 Controller 21 in a NAS 28. One or more T1/E1 (T3/E3) Controllers 21 exist on a NAS as the interfaces between a PSTN device and telephone network 18. The T1 Controller 21 must be programmed with the same signaling protocol as DTC 20 for these devices to properly communicate. If DTC 20 uses a proprietary signaling protocol which is not supported by the T1 Controller 21, then these devices will not be able to properly communicate. But if T1 Controller 21 supports a configurable signaling protocol, NAS 28 can be configured to communicate with DTC 20 as long as the signaling specifications are well understood. Standard signaling protocols are pre-configured within NAS 28 and are therefore available for T1 Controller 21 configuration with little need for understanding of the actual signaling specification. As a result, both standardized and proprietary signaling protocols can be supported by NAS 28 without the need to change or modify software. This allows for quick entry into new markets to sell PSTN devices, as no software changes are needed to support new signaling protocols.

Table 1 shows the template directives that can be used in programming the DCSSM (Dynamically Configurable Signaling State Machine) found within PSTN devices such as NAS 28. The directives fall into four categories: those that interact with the DSP, those that interact with controlling software (the controlling software is akin to the concept of an operating system in a personal computer, controlling the interrelationship of the various components of the T1 Controller), those that interact with the line signaling, and those that interact with the state machine itself.

For example, the standard incoming signaling format for the DS0 channel of a T1 CAS trunk with multi-frequency signaling is #ANI*#DNIS*, where ANI is Automatic Number Identification (i.e., the number of the calling party) and DNIS is Dialed Number Information Service (i.e., the number of the called party). This signaling template can be manually programmed with the directives of Table 1 using the signaling pattern "S<#a<*<#d<*n." (Of course, the signaling template for the DS0 channel of a T1 CAS trunk with multi-frequency signaling is a standardized signaling protocol, and is pre-programmed into the DCSSM.) An example proprietary incoming signaling template might be "S<#d<#a<*n." Since this signaling template is not pre-programmed, it would have to be configured into the DCSSM via the pattern string and then enabled on T1 Controller 21 via configuration. Both incoming and outgoing signaling templates are configurable for both incoming and outgoing calls respectively on each T1 Controller 21. Once configured, the signaling templates on the controller will not change from call to call.

TABLE 1

| | |
|---|---|
| S | Block the state machine and wait for instruction from controlling software to continue address collection/generation. |
| r | Hand over control of tone generation and interpretation to a separate state machine dedicated to handling R2 address signaling (a standard CAS protocol for E1 trunks). |
| A | Block the state machine and wait for a message from the line signaling to say that ANI collection can proceed (only used when line signaling is being used to synchronize address collection). |
| d | This directive has a different interpretation by the state machine depending on whether an incoming or outgoing call is being made.<br>Incoming: Block the state machine and wait for a digit to be collected from the DSP. If the digit is in the range 0–9 then append it to the DNIS variable. If the digit is outside of this range then either ignore that digit or terminate digit collection and continue the state machine (see the 'i' and 'I' directives). If the timer expires and the next directive is an 'o' then terminate digit collection and continue the state machine, and if the next directive is not an 'o' then terminate digit collection and notify the controlling software of a signaling failure. A modifier is allowed to this directive to limit the number of digits to be collected; the limit is inserted between square brackets ('[ ]'). For example, d[10] would only collect 10 digits.<br>Outgoing: Send digits stored in DNIS variable to the DSP for generation. |

TABLE 1-continued

| | |
|---|---|
| a | This directive has a different interpretation by the state machine depending on whether an incoming or outgoing call is being made.<br>Incoming: Block the state machine and wait for a digit to be collected from the DSP. If the digit is in the range 0–9 then append it to the ANI variable. If the digit is outside of this range then either ignore that digit or terminate this directive and continue the state machine (see the 'i' and 'I' directives). If the timer expires and the next directive is an 'o' then terminate digit collection and continue the state machine, and if the next directive is not an 'o' then terminate digit collection and notify the controlling software of a signaling failure.<br>A modifier is allowed to this directive to limit the number of digits to be collected, the limit is inserted between square brackets ('[ ]'). For example, a[10] would only collect 10 digits.<br>Outgoing: Send digits stored in ANI variable to the DSP for generation. |
| t | Start the timer. The timer duration is inserted between square brackets ('[ ]') and is specified in milliseconds. For example, t[8000] starts the timer for 8 seconds. |
| o | Block the state machine and wait for the timer to expire, or if located after either the 'd' or 'a' directives it means that a timer expiration in that directive is allowed. |
| I | Disable the aborting of digit collection if non-digits (i.e., A, B, C, D, *, #) are detected during the 'a' and 'd' digit collection directives. |
| i | Enable the aborting of digit collection if non-digits (i.e., A, B, C, D, *, #) are detected during the 'a' and 'd' digit collection directives. This is the default mode. |
| N | Notify the line signaling to send the line signal that requests the remote end to send the ANI (only used when line signaling is being used to synchronize address collection). |
| D | Block the state machine and wait for instruction from controlling software to use the DNIS in digit generation. |
| K | Notify the line signaling to send the line signal that indicates detection of the KP tone (only used when line signaling is being used to synchronize address collection). |
| w | Block the state machine and wait until the dial tone call progress tone has been detected. |
| n | Notify the controlling software of the collected address data (ANI and/or DNIS) |
| f | Notify the controlling software that the address data has been transmitted and address signaling has finished. |
| > | Send the following digit to the DSP for generation. e.g. '>A' would cause the tone for the digit A to be generated on the DSP. |
| < | Block the state machine and wait until the following digit has been detected. e.g. '<A' would wait until the tone for the digit A was detected by the DSP. |

Figure 3:
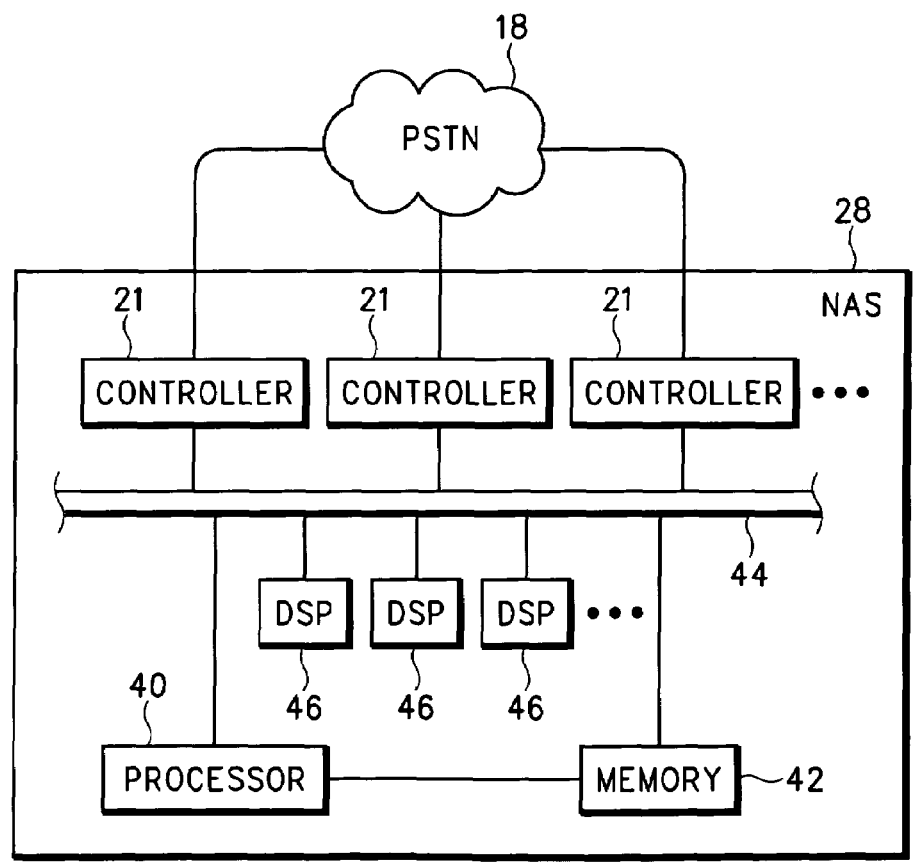
FIG. 3 shows the internal architecture of the PSTN NAS device.

FIG. 3 shows a typical architecture of a PSTN device such as a NAS. PSTN devices must have trunk controllers such as T1/E1 Controllers 21 that provide the physical interfaces to connect trunk lines to the device. These trunk lines are typically connected to the PSTN, managed by a telephone company. The PSTN devices have a main processor 40, which manages and executes the software that dictates the functionality and behavior for which the devices were designed. A NAS executes software to convert voice or data payload from the PSTN network to a data network such as the Internet. Other PSTN devices such as a PBX would execute software to manage inter-company phone calls and only route calls to the PSTN when users are making non-company calls. PSTN devices must also have a main memory block 42 which maintains the program store for the software being executed by processor 40 and also the data store which maintains all the variable data such as configuration information, call state information, etc. NAS devices also have one or more DSPs 46 that are used as modems, faxes, or VoIP framers. For CAS calls, DSPs 46 are also used as the address signaling collectors and generators for the T1/E1 Controllers 21. Processor 40 communicates and controls all the devices within the NAS via a shared communication bus 44. The communication bus is used by all of the NAS's internal components to inter-communicate with each other.

The DCSSM is typically executed within the scope of the main processor 40, which handles all incoming and outgoing call requests. The main processor looks at the configuration for the T1/E1 controller 21 on which the call is originating or terminating and locates the corresponding directives template for that controller in memory 42. The DCSSM then proceeds to execute the configured signaling state machine described by the directives template.

Figure 4:
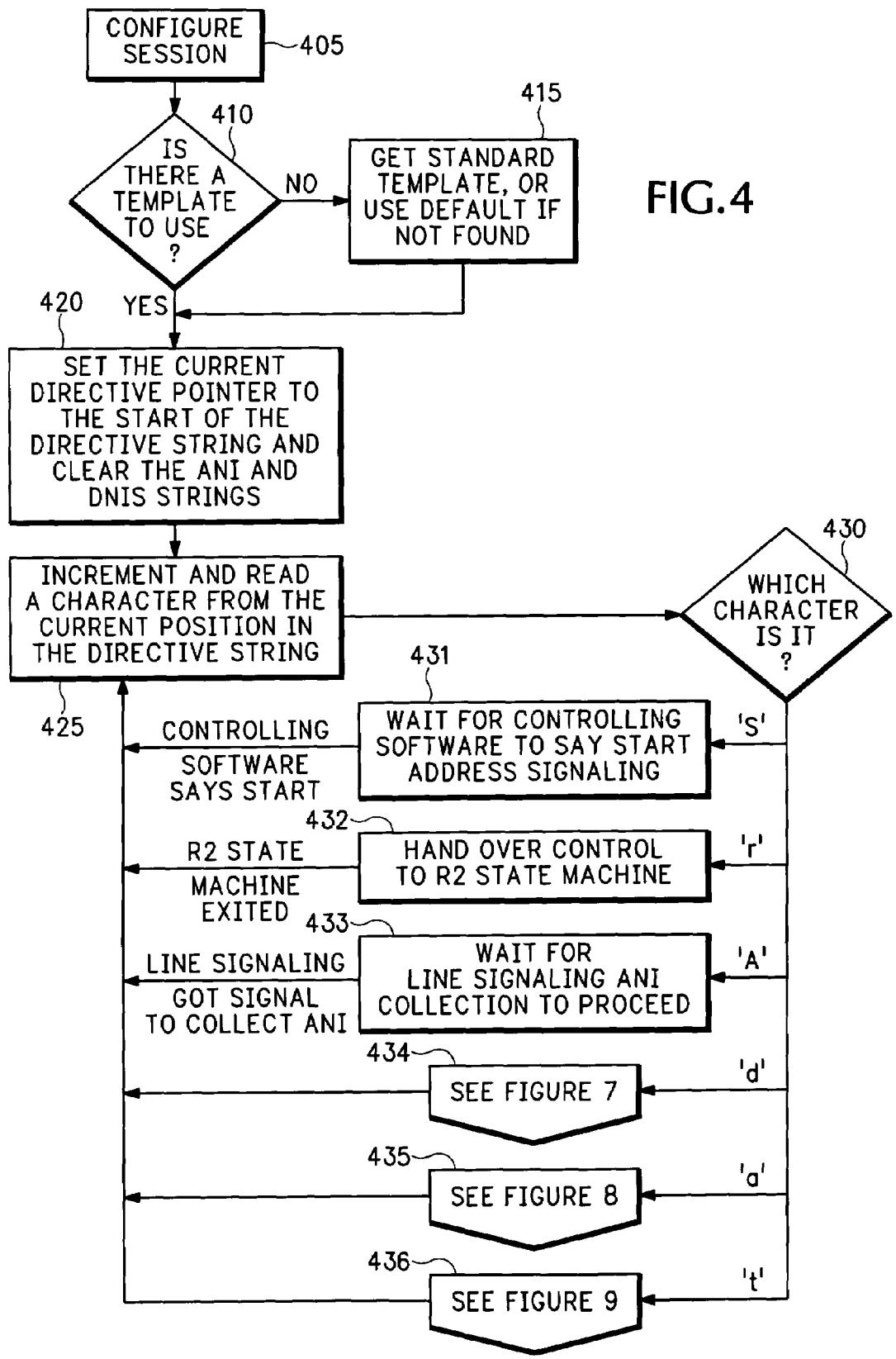
FIGS. 4–9 shows a flowchart of the method for using the Dynamically Configurable Signaling State Machine in the network device of FIG. 1.
Figure 5:
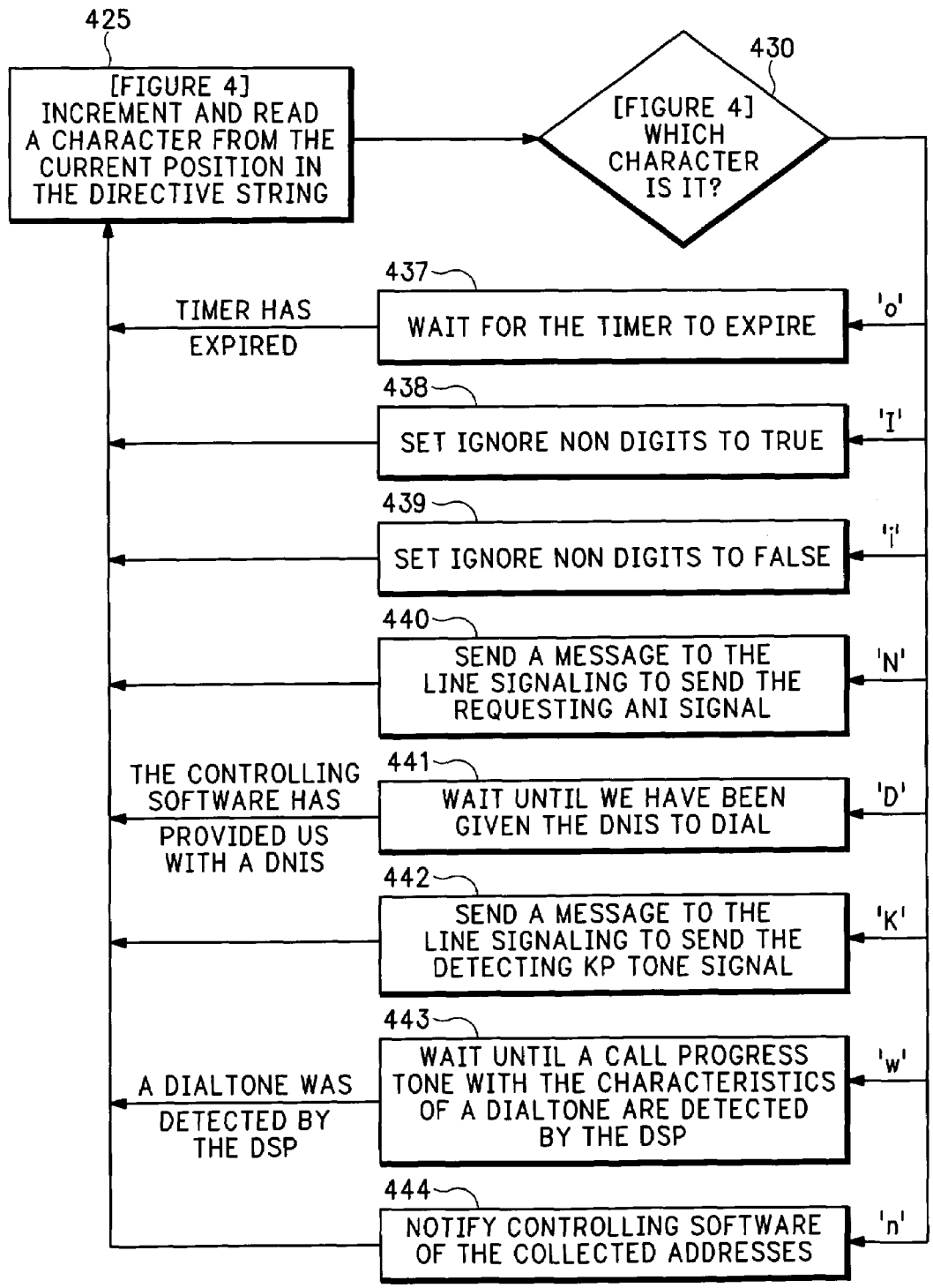
Figure 6:
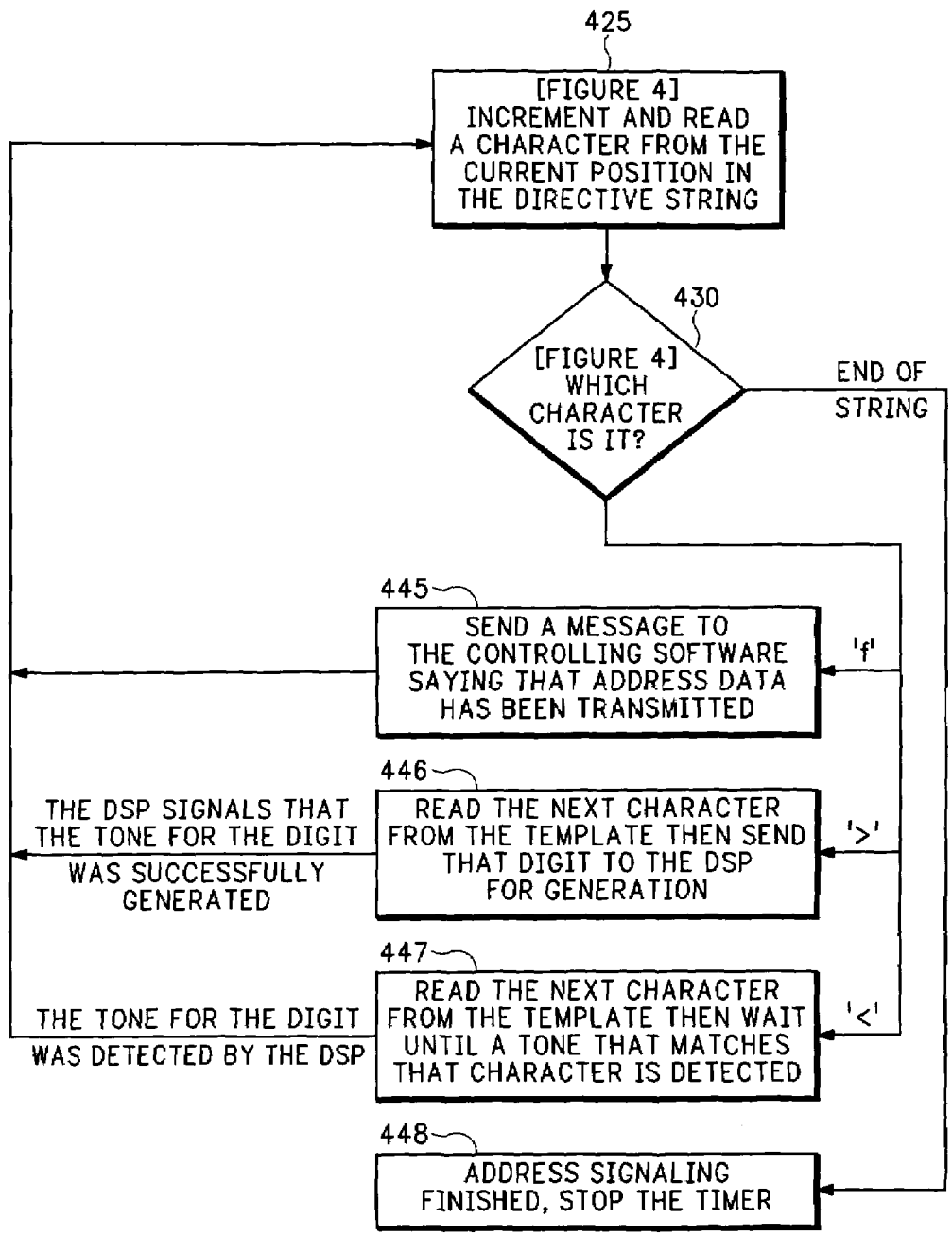

The operation of the DCSSM in its processing of the directives template can be described by the flowchart shown in FIGS. 4–9. Essentially the DCSSM picks directives from the template in a serial fashion (FIGS. 4–6), performing the desired actions, until the end of the template is reached at which time it stops. FIGS. 5 and 6 continue the processing of directives in the template after step 430 on FIG. 4.

In FIG. 4, at step 405 a session is to be configured. At step 410, the DCSSM checks to see if there is a template for address/digit collection. At step 415, the located template is used, or a default template is used if no template could be located. At step 420, the DCSSM initializes by clearing the ANI and DNIS strings and begins examining the directive string from the start. At step 425, the next character from the directive string is read. At step 430, the DCSSM acts based on the character read from the directive string. Steps 431–436 of FIG. 4, steps 437–444 of FIG. 5, and steps 445–448 of FIG. 6 show what actions are taken based on the character read from the directive string.

Figure 7:
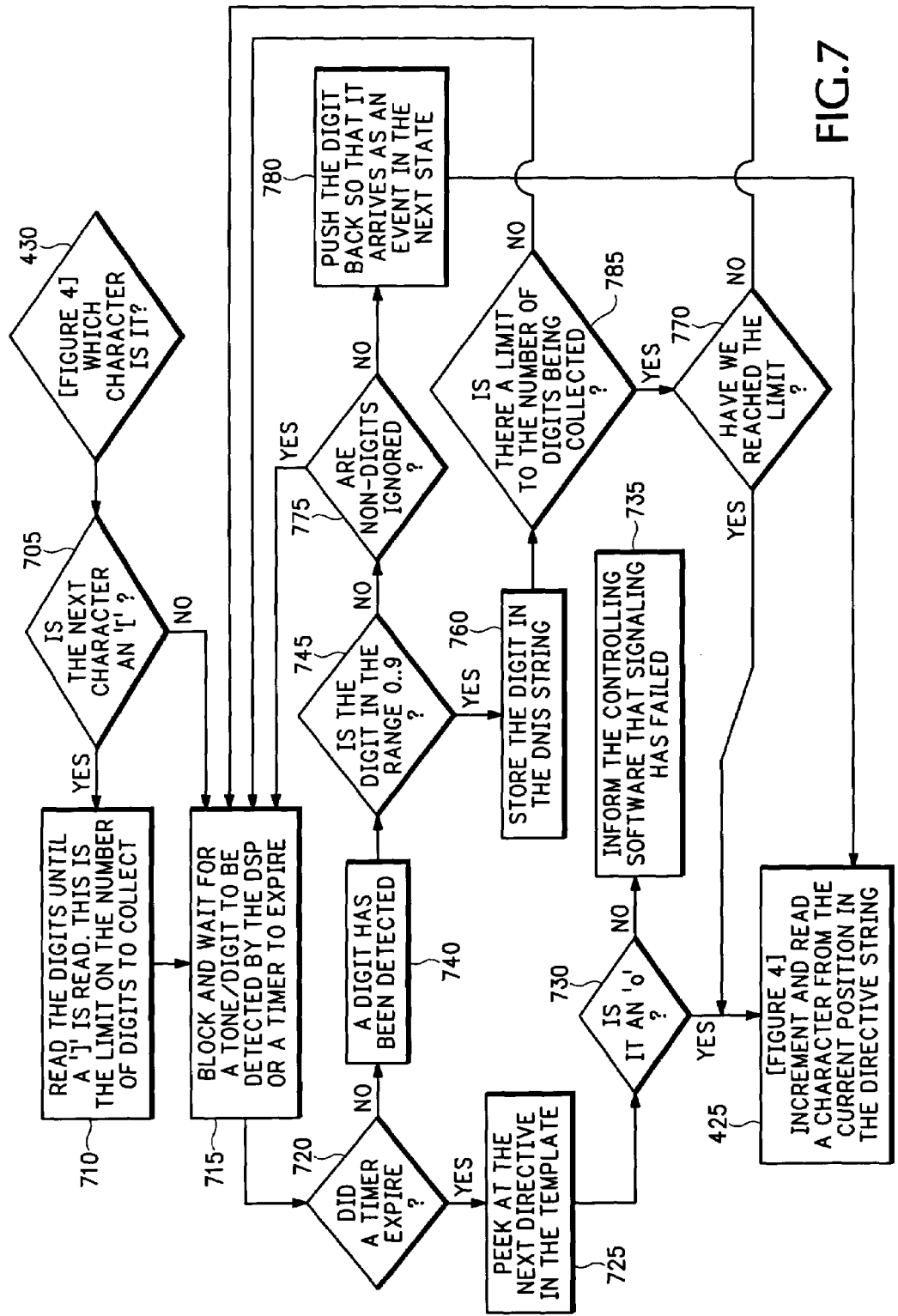
Figure 8:
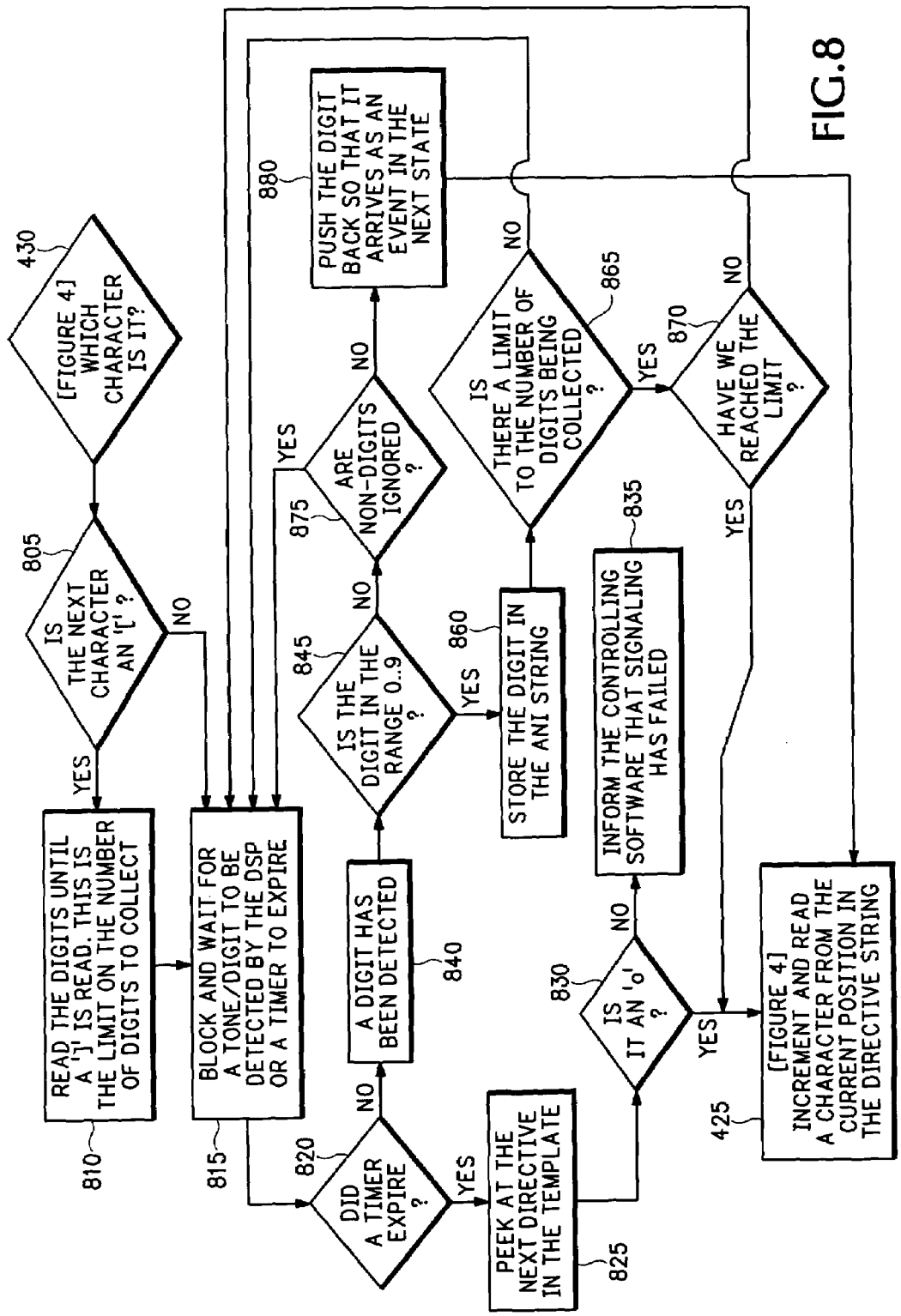
Figure 9:
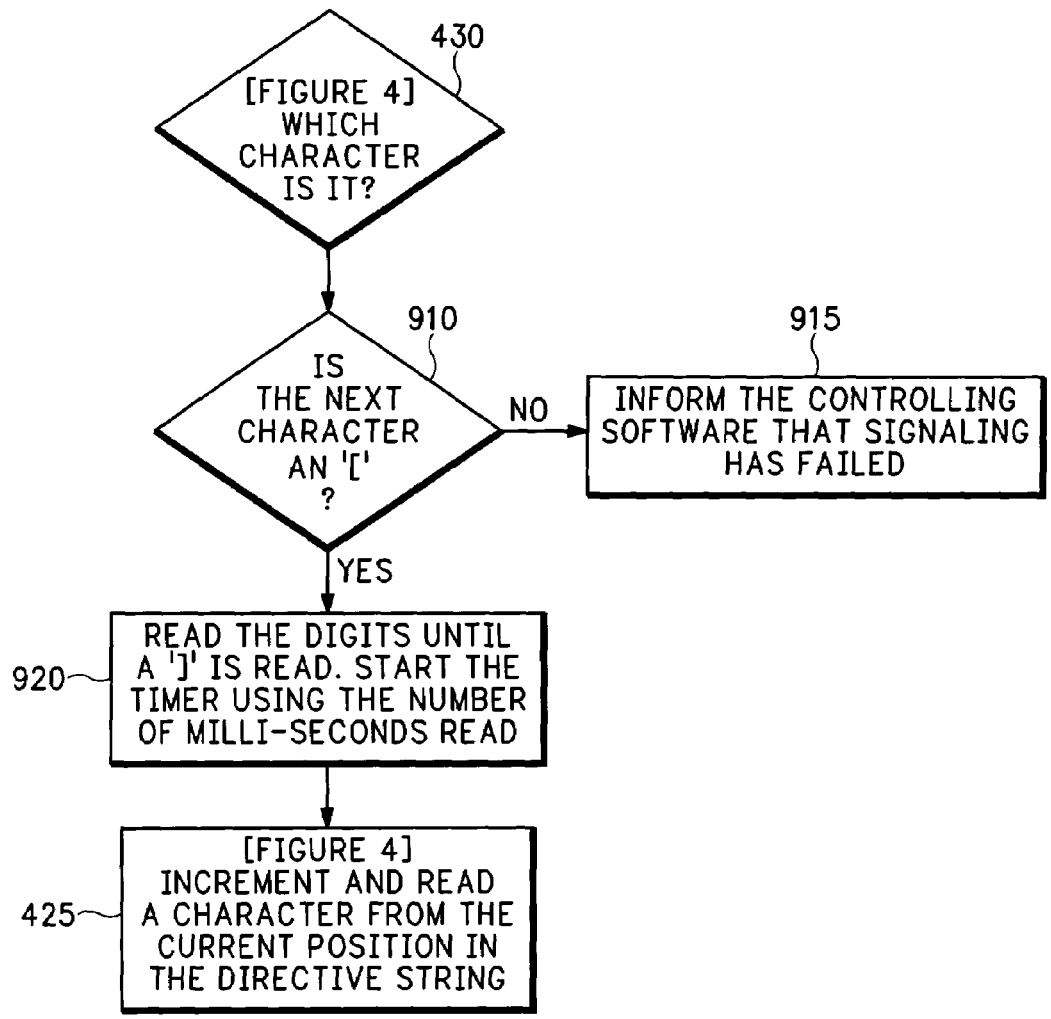

If the next character read from the directive string is an "S," then at step 431 the DCSSM blocks (waits to receive a signal) until the controlling software indicates address collection and generation can proceed. If the next character is an "r," then at step 432 control of tone generation and interpretation is turned over to a separate state machine dedicated to handling R2 address signaling (R2 address signaling is a standard CAS protocol). If the next character is an "A," then at step 433 the DCSSM blocks and waits for a message from the line signaling that ANI collection can proceed. If the next character is a "d," then at step 434 the procedure shown in FIG. 7 is used. If the next character is an "a," then at step 435 the procedure shown in FIG. 8 is used. If the next character is a "t," then at step 436 the procedure shown in FIG. 9 is used.

Turning to FIG. 5, if the next character is an "o," then at step 437 the DCSSM waits for the timer to expire. If the next character is an "I," then at step 438 the DCSSM sets a flag to ignore non-digits ("A," "B," "C," "D," "#", and "*") in processing "a" and "d" directives. If the next character is an "i," then at step 439 the DCSSM sets a flag to abort digit collection if a non-digit ("A," "B," "C," "D," "#", and "*") is detected while processing "a" and "d" directives. (This is the default setting.) If the next character is an "N," then at step 440 the DCSSM sends a message requesting the line signaling to send the signal requesting the ANI. If the next character is an "D," then at step 441 the DCSSM blocks and waits for a message from the line signaling that the DNIS can be used in digit generation. If the next character is an "K," then at step 442 the DCSSM sends the line signal indicating detection of the KP tone (the start-of-pulsing signal). If the next character is an "w," then at step 443 the DCSSM blocks until the dial tone call progress tone is detected. If the next character is an "n," then at step 444 the DCSSM notifies the controlling software of the collected address data.

Turning to FIG. 6, if the next character is an "f," then at step 445 the DCSSM notifies the controlling software that the collected address data has been transmitted. If the next character is an ">," then at step 446 the DCSSM sends the digit following the ">" character to the DSP for generation. If the next character is an "<," then at step 447 the DCSSM blocks until it detects the digit following the "<" character. Finally, if the end of the string has been reached, at step 448 the DCSSM completes its address signaling and stops the timer.

Note that in FIGS. 4–6, after processing a character according to any of steps 431–447, the procedure loops back and reads the next character from the directive string at step 425. This allows for processing of the complete directive string.

FIG. 7 shows a flowchart of the procedure used in processing an incoming "d" directive from the template. At step 705, the DCSSM checks to see there is a "[" character. The square bracket character indicates that the directive includes a modifier limiting the number of digits to be collected: for example, "d[10]" would indicate that ten digits are to be collected. If a "[" character is found, then at step 710 the modifier is read in to determine the number of digits to be collected. Whether or not there is a modifier, at step 715 the DCSSM blocks until either a tone is detected or a timer expires. At step 720, the DCSSM checks to see if the timer has expired. If the timer has expired, then at step 725 the DCSSM looks ahead to the next character in the directive. Step 730 checks to see if the next character is an "o." (Recall that the "o" character allows for the timer to expire during a "d" directive.) If the next character is an "o", then control returns to step 425 of FIG. 4 to process the next character. Otherwise, an error has occurred, and at step 735 the controlling software is notified of the signaling failure.

If the timer had not expired at step 720, then a tone was detected, as shown at step 740. At step 745, the DCSSM checks to see if the tone identifies a digit or a non-digit. If the tone identifies a digit, then at step 760 the digit is stored in the DNIS. Step 765 then checks to see if there is a limit to the number of digits to collect. If there is a limit, then step 770 checks to see if the limit has been reached. If the limit has been reached, control returns to step 425 of FIG. 4 to process the next character. Otherwise, if there is no limit or the limit has not been reached, control returns to step 715 to await the next tone or a timer expiration.

If at step 745 the tone identifies a non-digit, step 775 checks to see if the DCSSM is ignoring non-digits (specified by an "i" directive). If non-digits are being ignored, then control returns to step 715 to await the next tone or a timer expiration. If non-digits are not being ignored then at step 780 the non-digit tone is pushed back so that it arrives as an event in the next state, and control returns to step 425 of FIG. 4 to process the next character in the directive string.

FIG. 8 shows a flowchart of the procedure used in processing an incoming "a" directive from the template. At step 805, the DCSSM checks to see there is a "[" character. The square bracket character indicates that the directive includes a modifier limiting the number of digits to be collected: for example, "a[10]" would indicate that ten digits are to be collected. If a "[" character is found, then at step 810 the modifier is read in to determine the number of digits to be collected. Whether or not there is a modifier, at step 815 the DCSSM blocks until either a tone is detected or a timer expires. At step 820, the DCSSM checks to see if the timer has expired. If the timer has expired, then at step 825 the DCSSM looks ahead to the next character in the directive. Step 830 checks to see if the next character is an "o." (Recall that the "o" character allows for the timer to expire during a "a" directive.) If the next character is an "o", then control returns to step 425 of FIG. 4 to process the next character. Otherwise, an error has occurred, and at step 835 the controlling software is notified of the signaling failure.

If the timer had not expired at step 820, then a tone was detected, as shown at step 840. At step 845, the DCSSM checks to see if the tone identifies a digit or a non-digit. If the tone identifies a digit, then at step 860 the digit is stored in the ANI. Step 865 then checks to see if there is a limit to the number of digits to collect. If there is a limit, then step 870 checks to see if the limit has been reached. If the limit has been reached, control returns to step 425 of FIG. 4 to process the next character. Otherwise, if there is no limit or the limit has not been reached, control returns to step 815 to await the next tone or a timer expiration. If at step 845 the tone identifies a non-digit, step 875 checks to see if the DCSSM is ignoring non-digits (specified by an "i" directive). If non-digits are being ignored, then control returns to step 815 to await the next tone or a timer expiration. If non-digits are not being ignored then at step 880 the non-digit tone is pushed back so that it arrives as an event in the next state, and control returns to step 425 of FIG. 4 to process the next character in the directive string.

FIG. 9 shows a flowchart of the procedure used in processing a "t" directive from the template. At step 910, the DCSSM checks to see there is a "[" character. The square bracket character indicates that the directive starts a modifier specifying the duration of the timer in milliseconds: for example, "t[8000]" would indicate that an eight second timer is to be used. If a "[" character is not found, then an error has occurred, and at step 915 the controlling software is notified of the signaling failure.

If a "[" character is found, then at step 920 the directive string is read until a matching "]" character is found. The digits between the "[" and "]" characters specify the duration of the timer in milliseconds. The timer is then started, and control returns to step 425 of FIG. 4 to process the next character. The methods of FIGS. 4–9 can be implemented in many ways. In the preferred embodiment, the PSTN device processor includes software for implementing the methods of FIGS. 4–9. The software can be stored on a computer-readable medium. The computer-readable medium can be either removable (e.g., on a floppy disk or CD-ROM) or fixed (e.g., on a hard drive). However, a person skilled in the art will recognize that the method can be implemented in other ways, for example, encoded as firmware on a ROM chip.

As discussed above, the prior art network processor had to be "hard-coded" with the signaling protocol it was to recognize. While with standardized signaling protocols this was a trivial task, with proprietary signaling protocols this task was lengthy and expensive. This invention is an improvement over the prior art in that new signaling protocols can be specified with only a few instructions. The network processor does not have to be "hard-coded," saving time and money. Further, because the invention allows for multiple signaling protocols to be programmed into the DCSSM, the addition of a new signaling protocol does not require the removal of earlier-programmed signaling protocols.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A network processing device, comprising:
   a memory for storing a dynamically configurable set of signaling templates;
   a first trunk controller for receiving and transmitting first line signaling;
   a second trunk controller for receiving and transmitting second line signaling; and
   a device processor within a signaling state machine for conducting the first line signaling by executing a first of the dynamically configurable signaling templates in the memory and for conducting the second line signaling by executing a second of the dynamically configurable signaling templates in the memory, the device processor capable of programming a new signaling template into the dynamically configurable set of signaling templates and to associate the new signaling template with a trunk, the new signaling template association overriding an old association between an old signaling template in the dynamically configurable set of signaling templates and the trunk.

2. A network processing device according to claim 1 wherein the processor can delete an unneeded signaling template from the dynamically configurable set of signaling templates in the memory.

3. A network processing device according to claim 2 wherein the processor deletes the unneeded signaling template from the dynamically configurable set of signaling templates in the memory upon receiving a user command.

4. A network processing device according to claim 1, wherein the processor can insert a new signaling template to the dynamically configurable set of signaling templates in the memory.

5. A network processing device according to claim 4 wherein the processor inserts the new signaling template from the dynamically configurable set of signaling templates in the memory upon receiving a user command.

6. A network processing device according to claim 1 wherein the network processing device further comprises a digital signaling processor (DSP) for detecting and generating tones.

7. A network processing device according to claim 1 wherein the template includes characters representing the set of directives.

8. A network processing device according to claim 7 wherein the characters of the template are drawn from a set that map to an internal set of directives stored in the state machine to be used to specify the exact signaling behavior expected.

9. A network processing device according to claim 7 wherein the template represents a set of directives for controlling a state machine and line signaling, tone generation, and tone detection in a network processing device for an incoming call.

10. A network processing device according to claim 7 wherein the template represents a set of directives for controlling a state machine and line signaling, tone generation, and tone detection in a network processing device for an outgoing call.

11. A method for configuring a first trunk controller in a network processing device, the method comprising:
    programming a Dynamically Configurable Signaling State Machine with a new template to use in signaling over a trunk;
    assigning a name to the new template;
    associating the name for the new template with the trunk, overriding an old association between an old template and the trunk;
    determining signaling used over the trunk connected to the first trunk controller;
    giving the first trunk controller the name for the new template in a Dynamically Configurable Signaling State Machine (DCSSM) representing the signaling;
    conducting signaling on the first trunk controller using the new template; and
    conducting signaling on a second trunk controller using a second template in the DCSSM.

12. A method according to claim 11, wherein:
    determining signaling includes:
       determining an incoming signaling for calls incoming to the first trunk controller over the trunk; and
       determining an outgoing signaling for calls outgoing from the first trunk controller over the trunk; and
    giving the first trunk controller the name includes:
       giving the first trunk controller an incoming name for a template in the DCSSM representing the incoming signaling; and
       giving the first trunk controller an outgoing name for a template in the DCSSM representing the outgoing signaling.

13. A method according to claim 11, the method further comprising informing the DCSSM by the first trunk controller of the name for the template with which to process calls over the trunk.

14. A method according to claim 13, wherein informing the DCSSM includes:
    informing the DCSSM by the first trunk controller of an incoming signaling name for the template with which to process incoming calls over the trunk; and
    informing the DCSSM by the first trunk controller of an outgoing name for the template with which to process outgoing calls over the trunk.

15. A method for using a Dynamically Configurable Signaling State Machine (DCSSM) in a network processing device for processing signaling over a first trunk, the method comprising:
    programming the Dynamically Configurable Signaling State Machine with a new template to use in signaling over the first trunk;
    assigning a name to the new template;
    associating the name for the new template with the first trunk, overriding an old association between an old template and the first trunk;
    receiving the name of the new template representing a signaling; processing signaling over the first trunk according to the new template; and
    processing signaling over a second trunk according to a second template in the DCSSM.

16. A method according to claim 15, wherein;
    receiving the name of the new template includes:
       receiving an incoming name of an incoming template representing an incoming signaling; and
       receiving an outgoing name of an outgoing template representing an outgoing signaling; and
    processing signaling includes:
       processing incoming signaling according to the incoming template; and
       processing outgoing signaling according to the outgoing template.

17. A method according to claim 15, wherein processing signaling includes:
- receiving the signaling;
- comparing the signaling with a set of directives represented by the new template; and
- performing the set of directives represented by the new template.

18. A method according to claim 17, wherein processing signaling further includes reporting an error if the signaling does not match the set of directives represented by the template.

19. A computer-readable medium containing a program for using a Dynamically Configurable Signaling State Machine (DCSSM) in a network processing device for processing signaling over a trunk, the program comprising:
- programming software to program the Dynamically Configurable Signaling State Machine with a new template to use in signaling over the trunk;
- assignment software to assign a name to the new template;
- association software to associate the name for the new template with the trunk, overriding an old association between an old template and the trunk;
- first reception software to receive the name of the new template representing a signaling, the name of the template determined using the signaling over the trunk; and
- processing software to process signaling over the trunk according to the template.

20. A computer-readable medium containing a program according to claim 19, wherein processing signaling includes:
- second reception software to receive the signaling;
- comparison software to compare the signaling with a set of directives represented by the template; and
- performance software to perform the set of directives represented by the template.

21. A network processing device for processing signaling over a first trunk using a Dynamically Configurable Signaling State Machine (DCSSM), the device comprising:
- means for programming the Dynamically Configurable Signaling State Machine with a new template to use in signaling over the first trunk;
- means for assigning a name to the new template;
- means for associating the name for the new template with the first trunk, overriding an old association between an old template and the first trunk;
- means for receiving the name of the new template representing a signaling; and
- means for processing signaling over the first trunk according to the template and for processing signaling over a second trunk according to a second template in the DCSSM.

22. A device according to claim 21, wherein processing signaling includes:
- means for receiving the signaling over the first trunk;
- means for comparing the signaling over the first trunk with a set of directives represented by the template; and
- means for performing the set of directives represented by the template.

23. A computer-readable medium containing a program for configuring a first trunk controller in a network processing device, the method comprising:
- programming software to program a Dynamically Configurable Signaling State Machine with a new template to use in signaling over a trunk;
- assignment software to assign a name to the new template;
- association software to associate the name for the new template with the trunk, overriding an old association between an old template and the trunk;
- determination software to determine signaling used over the trunk connected to the first trunk controller;
- giving software to give the first trunk controller the name for the new template in a Dynamically Configurable Signaling State Machine (DCSSM) representing the signaling;
- conducting software to conduct signaling on the first trunk controller using the new template; and
- conducting software to conduct signaling on a second trunk controller using a second template in the DCSSM.

24. A computer-readable medium containing a program according to claim 23, wherein:
- the determination software includes:
  - determination software to determine an incoming signaling for calls incoming to the first trunk controller over the trunk; and
  - determination software to determine an outgoing signaling for calls outgoing from the first trunk controller over the trunk; and
- the giving software includes:
  - giving software to give the first trunk controller an incoming name for a template in the DCSSM representing the incoming signaling; and
  - giving software to give the first trunk controller an outgoing name for a template in the DCSSM representing the outgoing signaling.

25. A network processing device for configuring a first trunk controller, the device comprising:
- means for programming a Dynamically Configurable Signaling State Machine with a new template to use in signaling over a trunk;
- means for assigning a name to the new template;
- means for associating the name for the new template with the trunk, overriding an old association between an old template and the trunk;
- means for determining signaling used over the trunk connected to the first trunk controller;
- means for giving the first trunk controller the name for the new template in a Dynamically Configurable Signaling State Machine (DCSSM) representing the signaling; and
- means for conducting signaling on the first trunk controller using the new template and for conducting signaling on the second trunk controller using a second template in the DCSSM.

26. A device according to claim 25, wherein:
means for determining signaling includes:
- means for determining an incoming signaling for calls incoming to the first trunk controller over the trunk; and
- means for determining an outgoing signaling for calls outgoing from the first trunk controller over the trunk; and means for giving the first trunk controller a name includes:
- means for giving the first trunk controller an incoming name for a template in the DCSSM representing the incoming signaling; and
- means for giving the first trunk controller an outgoing name for a template in the DCSSM representing the outgoing signaling.

27. A network processing device according to claim 4 wherein the processor can delete an unneeded signaling template from the dynamically configurable set of signaling templates in the memory.

28. A network processing device according to claim 5 wherein the processor can delete an unneeded signaling template from the dynamically configurable set of signaling templates in the memory upon receiving a user command.

29. A method according to claim 11, wherein programming a Dynamically Configurable Signaling State Machine with a now template includes inserting the new template into the Dynamically Configurable Signaling State Machine.

30. A method according to claim 29, wherein programming a Dynamically Configurable Signaling State Machine with a new template further includes deleting an unneeded template from the Dynamically Configurable Signaling State Machine.

31. A method according to claim 15, wherein programming the Dynamically Configurable Signaling State Machine with a new template includes inserting the new template into the Dynamically Configurable Signaling State Machine.

32. A method according to claim 31, wherein programming the Dynamically Configurable Signaling State Machine with a new template further includes deleting an unneeded template from the Dynamically Configurable Signaling State Machine.

33. A computer-readable medium containing a program according to claim 19, wherein the programming software includes insertion software to insert the new template into the Dynamically Configurable Signaling State Machine.

34. A computer-readable medium containing a program according to claim 33, wherein the programming software further includes deletion software to delete an unneeded template from the Dynamically Configurable Signaling State Machine.

35. A device according to claim 21, wherein the means for programming includes means for inserting the new template into the Dynamically Configurable Signaling State Machine.

36. A device according to claim 35, wherein the means for programming further includes means for deleting an unneeded template from the Dynamically Configurable Signaling State Machine.

37. A computer-readable medium containing a program according to claim 23, wherein the programming software includes insertion software to insert the new template into the Dynamically Configurable Signaling State Machine.

38. A computer-readable medium containing a program according to claim 37, wherein the programming software further includes deletion software to delete an unneeded template from the Dynamically Configurable Signaling State Machine.

39. A device according to claim 21, wherein the means for programming includes means for inserting the new template into the Dynamically Configurable Signaling State Machine.

40. A device according to claim 39, wherein the means for programming further includes means for deleting an unneeded template from the Dynamically Configurable Signaling State Machine.

\* \* \* \* \*